United States Patent
Duan et al.

(10) Patent No.: US 12,255,339 B2
(45) Date of Patent: Mar. 18, 2025

(54) SINGLE-ATOM TAILORING OF PLATINUM NANOCATALYSTS FOR HIGH-PERFORMANCE MULTIFUNCTIONAL ELECTROCATALYSIS

(71) Applicant: THE REGENTS OF THE UNIVERSITY OF CALIFORNIA, Oakland, CA (US)

(72) Inventors: Xiangfeng Duan, Los Angeles, CA (US); Yu Huang, Los Angeles, CA (US); Chengzhang Wan, Los Angeles, CA (US); Mufan Li, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 693 days.

(21) Appl. No.: 17/605,192

(22) PCT Filed: Apr. 21, 2020

(86) PCT No.: PCT/US2020/029124
§ 371 (c)(1),
(2) Date: Oct. 20, 2021

(87) PCT Pub. No.: WO2020/219452
PCT Pub. Date: Oct. 29, 2020

(65) Prior Publication Data
US 2022/0246948 A1    Aug. 4, 2022

Related U.S. Application Data

(60) Provisional application No. 62/836,996, filed on Apr. 22, 2019.

(51) Int. Cl.
*H01M 12/06* (2006.01)
*C25B 11/081* (2021.01)
(Continued)

(52) U.S. Cl.
CPC ......... *H01M 4/925* (2013.01); *C25B 11/081* (2021.01); *C25B 11/089* (2021.01); *H01M 4/921* (2013.01); *H01M 12/06* (2013.01); *H01M 12/08* (2013.01)

(58) Field of Classification Search
CPC ...... H01M 4/925; H01M 4/921; H01M 12/06; H01M 12/08
See application file for complete search history.

(56) References Cited

U.S. PATENT DOCUMENTS

2016/0126562 A1* 5/2016 Pivovar .................... B22F 1/07
502/330

OTHER PUBLICATIONS

Cui, C et al. "Direct evidence for active site-dependent formic acid eletrooxidation by topmost-surface atomic redistribution in ternary PtPdCu electrocatalyst." Chemical Communications. Oct. 30, 2012. vol 48, pp. S1, S3, figures S1, S3a.
(Continued)

*Primary Examiner* — Jane J Rhee
(74) *Attorney, Agent, or Firm* — Foley & Lardner LLP

(57) ABSTRACT

Provided herein are catalyst materials comprising a catalyst support; and PtM' nanowires affixed to the catalyst support, wherein the PtM' nanowires include single atomic species of M' at exterior surfaces of the PtM' nanowires, and M' represents at least one metal, e.g., a metal different from Pt. Also disclosed are manufacturing methods comprising: providing initial MM' nanowires having an initial molar ratio of M:M', wherein M is a noble metal, and M' is a metal different from M; subjecting the initial MM' nanowires to electrochemical dealloying to partially remove M' and form partially dealloyed MM' nanowires having a subsequent molar ratio of M:M', wherein the subsequent molar ratio of M:M' is greater than the initial molar ratio of M:M'; and affixing the partially dealloyed MM' nanowires to a catalyst support.

20 Claims, 10 Drawing Sheets

Pt with Ni neighbor     Pt without Ni neighbor     Ni

(51) Int. Cl.
    C25B 11/089    (2021.01)
    H01M 4/92      (2006.01)
    H01M 12/08     (2006.01)

(56) References Cited

OTHER PUBLICATIONS

Foreign Search Report on PCT PCT/US2020/029124 DTD Jul. 16, 2020.

Koh, S et al. Electrocatalysis on Bimetallic Surfaces: Modifying Catalytic Reactivity for Oxygen Reduction by Voltammetric Surface Dealloying. J. Am. Chem, Soc. 2007. vol 129. p. 12625, figure 5.

Li, M et al. Single-atom tailoring of platinum nanocatalysts for high-performance multifunctional electrocatalysis. Jun. 1, 2019. Nature Catalysis. vol. 2(6), p. 3-5, figures 1-2.

Li, M et al. Ultrafine jagged platinum nanowires enable ultrahigh mass activity for the oxygen reduction reaction. Science. Dec. 16, 2016. vol. 354, pp. 1415-1416.

Millet, M et al. Ni Single Atom Catalysts for CO2 Activation. J. Am. Chem. Soc. Jan. 14, 2019. vol. 141.

\* cited by examiner

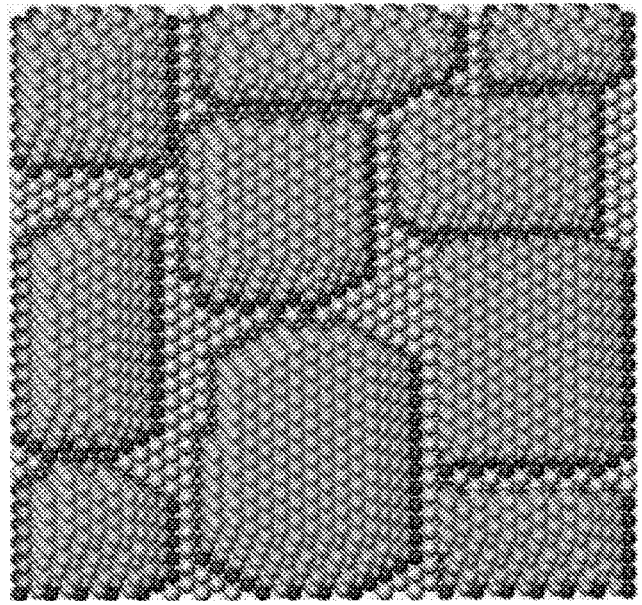
FIG. 5A
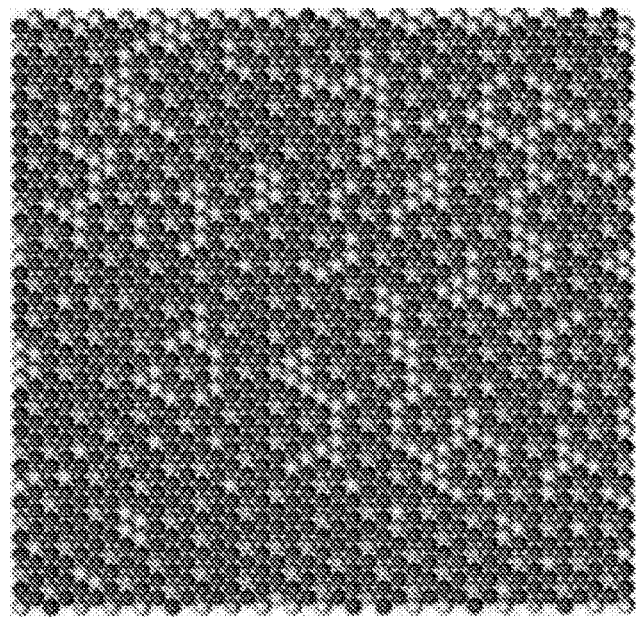
FIG. 5B
| | Surface Pt sites before decoration | Surface Pt sites after decoration | Pt sites with Ni neighbor | Pt sites w/o Ni neighbor | Pt sites blocked by Ni |
|---|---|---|---|---|---|
| SANi decorated Pt surface | 1394 | 1204 | 933 | 271 | 190 |
| Ni NPs decorated Pt Surface | 1394 | 557 | 356 | 201 | 837 |
FIG. 5C

SINGLE-ATOM TAILORING OF PLATINUM NANOCATALYSTS FOR HIGH-PERFORMANCE MULTIFUNCTIONAL ELECTROCATALYSIS

CROSS-REFERENCE TO RELATED APPLICATIONS

This application is a 371 National Stage of International Application No. PCT/US2020/029124, filed Apr. 21, 2020, which claims the benefit of U.S. Provisional Patent Application No. 62/836,996, filed Apr. 22, 2019, each of which are incorporated by reference herein in their entirety.

STATEMENT REGARDING FEDERALLY SPONSORED RESEARCH OR DEVELOPMENT

This invention was made with government support under Grant Number 1800580, awarded by the National Science Foundation and Grant Number N000141812155, awarded by the U.S. Navy, Office of Naval Research. The government has certain rights in the invention.

BACKGROUND

Platinum (Pt) represents the most iconic element for various energy related electrocatalytic systems, such as hydrogen evolution reaction (HER), oxygen reduction reaction (ORR), methanol oxidation reaction (MOR) and ethanol oxidation reactions (EOR). The electrocatalytic activity and stability of Pt make it the most widely considered material for diverse electrochemical reactions. However, its high cost and scarcity seriously constrain the practical applications of the Pt-based electrocatalysts and widespread adoption of the relevant technologies. Thus, a central challenge for Pt-powered reactions is how to substantially reduce the amount of Pt in the catalysts, which demands a major leap in Pt mass activity (MA) (e.g., the catalytic current per unit mass of Pt).

The MA is determined by the product of the electrochemically active surface area (ECSA, normalized by mass) and the specific activity (SA, catalytic current normalized by ECSA). Considerable efforts have been placed on improving the ECSA by tailoring various geometrical factors, including creating ultrafine nanostructures or core/shell nanostructures with an ultrathin Pt skin to expose most Pt atoms on the surface for catalytic reactions. In parallel, intensive efforts have been devoted to optimizing the SA for various electrochemical processes by tuning the chemical compositions, exposed catalytic surface and surface topology. In particular, surface modification/decoration of Pt catalysts represents an interesting pathway to tailor the electrocatalytic activity. For example, combining Pt-based material with transition metal hydroxides (e.g., $Ni(OH)_2$) can greatly enhance SA for HER and MOR in alkaline electrolytes. However, such modification inevitably blocks some surface active sites and often results in a relatively small ECSA (about 20-60 $m^2/g_{Pt}$, typically with about 30-50% lower than those without modification). This represents an intrinsic dilemma for the surface modification strategy, which may tailor the local electronic structure to boost the SA for a given reaction, but usually at a substantial sacrifice of the ECSA. Together, these competing factors make it extremely challenging to simultaneously achieve a high SA and a high ECSA in the same catalyst system, which is desired for delivering a high MA.

It is against this background that a need arose to develop the embodiments described herein.

SUMMARY

Platinum-based nanocatalysts play an important role in various electrocatalytic systems for renewable clean energy conversion, storage and utilizations. However, the scarcity and high cost of Pt seriously constrain their practical application. Decorating Pt catalysts with other transition metals provides an effective pathway to tailor their catalytic property for specific reactions, but often at the sacrifice of the electrochemical active surface area (ECSA). Here some embodiments provide a single-atom tailoring strategy to boost the activity of Pt nanocatalysts with reduced loss in surface active sites. By starting with PtNi alloy nanowires and using a partial electrochemical dealloying approach, creation is made of single nickel atom modified Pt nanowires with an optimum combination of specific activity and ECSA for the hydrogen evolution, methanol oxidation and ethanol oxidation reactions. The single-atom tailoring approach provides an effective strategy to optimize the activity of surface Pt atoms and enhance the Pt mass activity for diverse reactions and opens a general pathway to the design of highly-efficient and durable precious metal-based catalysts.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF DRAWINGS

FIG. 2(a) shows an HAADF-STEM image of SANi-PtNWs, with the white arrows highlighting the surface defects, steps and concave cavity sites. FIG. 2(b) shows Ni EELS mapping. FIG. 2(c) shows overlaid image of Ni-EELS mapping on Pt, with red representing Pt and green representing Ni. FIG. 2(d) shows Pt EXAFS fitting result and FIG. 2(e) shows Ni EXAFS fitting result.

FIG. 3 shows the electrocatalytic performance of an embodiment of SANi-PtNWs for HER compared against Pt/C and pure-PtNWs in about 1 M KOH electrolyte.

FIG. 4($a$) shows the MOR CVs under sweeping rate of about 20 mV/s, the concentration of methanol is about 1 M. FIG. 4($b$) shows the EOR CVs under sweeping rate of about 20 mV/s, the concentration of ethanol is about 1 M. FIG. 4($c$) shows the MOR and FIG. 4($d$) shows the EOR peak mass activity comparison with the state-of-art values. Ref. 4 is Huang, X., et al., Science 348, 1230-1234 (2015); Ref. 5 is Ren, F., et al., Journal of Materials Chemistry A 1, 7255-7261 (2013); Ref. 6 is Feng, Y.-Y., et al., Journal of catalysis 290, 18-25 (2012); Ref. 7 is Wu, H., et al., Adv. Mater. 24, 1594-1597 (2012); Ref. 8 is Ren, F., et al., ACS Appl. Mater. Interfaces 6, 3607-3614 (2014); Ref. 9 is Danilovic, N., et al., Angewandte Chemie 124, 12663-12666 (2012). Error bars in d and e indicate the standard deviation of ten independent samples. *The material in ref. 6 was tested in about 0.5 M KOH and about 2 M methanol, and that in ref. 8 was tested in about 0.5 M NaOH.

FIG. 5($a$) shows a model of Pt (111) surface decorated by single Ni atom species [Ni(OH)$_2$ species, simplified as Ni] and FIG. 5($b$) shows a model of Pt (111) surface decorated by 1-2 nm nanoparticles, with grey representing regular Pt (111) surface site, red representing activated Pt atoms with Ni neighbor, and green representing sites blocked by Ni. FIG. 5($c$) compares different types of Pt sites for the single atom and nanoparticle decorated Pt surface in the simplified model in a and b. For a Pt (111) surface with a total 1394 Pt sites decorated with 190 single Ni atoms (green), there are a total of 1204 exposed Pt atoms, with 933 having a Ni neighbor (red) and 271 having no Ni neighbor (blue); while for the same Pt (111) surface (a total of 1394 initial Pt surface sites) decorated with 1-2 nm Ni nanoparticles, there are 557 exposed Pt atoms on surface, with 356 having a Ni neighbor and 201 without Ni neighbor. This comparison highlights the single atom modifications activate more surface sites (with Ni neighbors) while blocking much fewer Pt sites.

FIG. 6($c$) shows a CV in about 0.1 M HClO$_4$ of PtNi alloy NWs at different scan cycles. FIG. 6($d$) shows ECSA evolution of the nanowire samples with increasing number of dealloying CV cycles (error bars showing the variations from ten independent batches). FIG. 6($e$) shows the acidic CO stripping curves for Pt$_{17}$Ni$_{83}$ nanowires dealloyed at different cycles. FIG. 6($f$) shows a comparison of the ECSA evolution (vs. the number of dealloying CV cycles) derived from Hupd and CO stripping, respectively. FIG. 6($g$) shows HER polarization curve for Pt/C and PtNi nanowires dealloyed with different numbers of CV cycles. FIG. 6($h$) shows the mass activity of the dealloyed nanowires as a function of the number CV cycles, with the peak HER activity achieved after the 180$^{th}$ CV cycles (error bars showing the variations from ten independent batches), when the surface decorating species is in single atomic state to ensure maximum activation and the least surface blockage.

FIG. 7($a$) shows ECSA normalized HER LSVs for Pt/C and SANi-PtNWs in about 4 M KOH with about 95% iR-compensation at the scan rate of about 5 mV/s. FIG. 7($b$) shows ECSA normalized HER LSVs for Pt/C and SANi-PtNWs at about 313 K and about 333 K, respectively. The measurements were conducted in about 1 M KOH with about 95% iR-compensation at the scan rate of about 5 mV/s.

FIG. 10($b$) shows CO stripping results for pure-PtNWs. FIG. 10($c$) shows CO stripping results for SANi-PtNWs. The measurements were conducted in about 1 M KOH at the scan rate of about 25 mV/s.

DETAILED DESCRIPTION

Catalyst Materials

Figure 1:
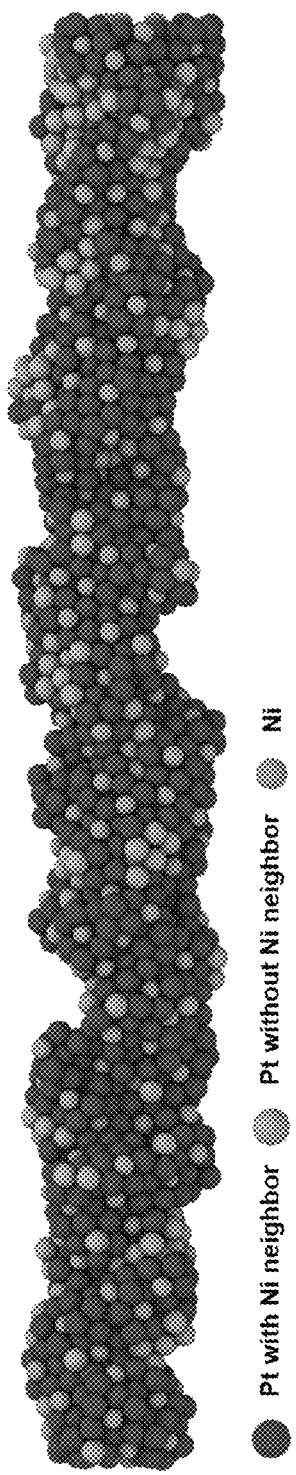
FIG. 1 shows a schematic diagram for an embodiment of SANi-PtNWs. The decoration of ultrafine PtNWs with single atomic nickel species tailors the local electronic structure to boost the specific catalytic activity for diverse electrochemical reactions with reduced sacrifice in the number of surface active sites. Grey atoms represent regular Pt (111) surface sites, green atoms represent isolated Ni sites (Ni is liganded to two OH groups in electrocatalytic conditions), and red atoms represent activated Pt atoms with Ni neighbor as catalytically hot sites.

In one aspect, the present disclosure includes catalyst material comprising: a catalyst support; and MM' nanostructures (e.g., nanowires or nanoparticles) affixed to the catalyst support, wherein the MM' nanostructures (e.g., nanowires or nanoparticles) include single atomic species of M' at exterior surfaces of the MM' nanowires, where M represents at least one functional (e.g., catalytic) metal and M' is another metal.

In some embodiments, M is at least one noble metal, such as selected from Pt, ruthenium (Ru), palladium (Pd), silver (Ag), rhodium (Rh), osmium (Os), iridium (Ir), and gold (Au). In some embodiments, M includes two different functional metals $M_1$ and $M_2$, where $M_1$ and $M_2$ are different noble metals, such as selected from Pt, Ru, Pd, Ag, Rh, Os, Ir, and Au. In some embodiments, M includes three or more different functional metals. Certain preferred embodiments include where M comprises Pt.

In some embodiments, M' is a metal other than M. For example, in certain embodiments, M' is at least one metal selected from transition metals of Group 3, Group 4, Group 5, Group 6, Group 7, Group 8, Group 9, Group 10, Group 11, and Group 12 of the Periodic Table, as well as post-transition metals, and with M' being different from M. In some embodiments, M' is selected from nickel (Ni), iron (Fe), cobalt (Co), and copper (Cu). In some embodiments, M' is Ni. In some embodiments, M' includes two different metals M'$_1$ and M'$_2$, where M'$_1$ and M'$_2$ are different metals selected from transition metals and post-transition metals. In some embodiments, M' includes three or more different metals.

In some embodiments, the MM' (e.g., PtM') nanostructures include single atomic species of M' at exterior surfaces of the MM' (e.g., PtM') nanostructures. In some embodiments, the partially MM' (e.g., PtM') nanostructures have a molar content of M' in a range of about 5% to about 15%.

In some embodiments, the MM' (e.g., PtM') nanostructures include an alloy of M and M' that can be represented by the formula $M_xM'_y$, where "x" represents a molar content (e.g., expressed as a percentage) of M, "y" represents a molar content of M', and x/y represents the initial molar ratio of M:M'. In some embodiments, each of x and y has a non-zero value, and subject to the condition that x+y=100 (or 100%). In some embodiments, x<y, and the initial molar ratio of M:M' is less than 1. In some embodiments, y has a non-zero value in a range of about 50 or greater and up to about 95 or greater, such as about 55 to about 95, about 60 to about 90, about 70 to about 90, about 75 to about 90, or about 80 to about 90

In some embodiments, MM' (e.g., PtM') nanostructures include an alloy of M and M' that can be represented by the formula $M_aM'_b$, where "a" represents a molar content (e.g., expressed as a percentage) of M, "b" represents a molar content of M', and a/b represents the subsequent molar ratio of M:M'. In some embodiments, each of a and b has a non-zero value, and subject to the condition that a+b=100 (or 100%). In some embodiments, a>b, and the subsequent molar ratio of M:M' is greater than 1. In some embodiments, b has a non-zero value in a range of about 5 or greater and up to about 15 or greater, such as at least about 6 and up to about 14, up to about 13, up to about 12, up about 11, up to about 10, up to about 9, or up to about 8.

In some embodiments, MM' (e.g., PtM') nanostructures have one or more of the following characteristics: (1) the nanostructures have lateral dimensions or extents (e.g., in terms of an average width or an average diameter) in a range of up to about 10 nm, up to about 5 nm, up to about 4 nm, up to about 3.5 nm, up to about 3 nm, up to about 2.8 nm, up to about 2.5 nm, up to about 2.3 nm, up to about 2.2 nm, or up to about 2 nm, and down to about 1.8 nm, down to about 1.5 nm, or less; (2) the nanostructures have longitudinal dimensions or extents (e.g., in terms of an average length) in a range of at least about 100 nm, at least about 150 nm, at least about 200 nm, or at least about 250 nm, and up to about 500 nm, up to about 1000 nm, or more; (3) the nanostructures have a molar content of M' in a range of about 5 or greater and up to about 15 or greater, such as at least about 6 and up to about 14, up to about 13, up to about 12, up about 11, up to about 10, up to about 9, or up to about 8; and (4) the nanostructures have exterior surfaces including single atomic species of M' at the exterior surfaces (e.g., at a surface atomic density of about 0.5 surface atom of M' per $nm^2$ or greater and up to about 10 surface atoms of M' per $nm^2$ or greater, such as at least about 1 surface atom of M' per $nm^2$ and up to about 9 surface atoms of M' per $nm^2$, up to about 8 surface atoms of M' per $nm^2$, up to about 7 surface atoms of M' per $nm^2$, up to about 6 surface atoms of M' per $nm^2$, up to about 5 surface atoms of M' per $nm^2$, up to about 4 surface atoms of M' per $nm^2$, or up to about 3 surface atoms of M' per $nm^2$).

In some embodiments, a catalyst material includes partially dealloyed MM' (e.g., PtM') nanostructures that are loaded on, dispersed in, affixed to, anchored to, or otherwise connected to a catalyst support. In some embodiments, the catalyst material has an electrochemical active surface area of at least about 80 $m^2/g_M$, at least about 85 $m^2/g_M$, at least about 90 $m^2/g_M$, at least about 95 $m^2/g_M$, at least about 100 $m^2/g_M$, or about 106 $m^2/g_M$.

In general, for Pt nanocatalysts decorated with a given transition metal (e.g., nickel) species, in which nickel-based nanostructures function as the catalyst promoter to enhance the catalytic activity of nearby surface Pt atoms, it is desired to reduce the size of the decorating species to mitigate against unnecessary blockage of surface Pt sites while creating the most activated Pt site with nickel neighbors for enhanced SA. In this regard, the ultimate limit of the decorating species is single atoms, which uses the smallest number of nickel species to activate the most Pt atoms while blocking the least amount of surface Pt sites to ensure the highest mass activity (FIG. 5). However, the creation of single atom decorated Pt surface is challenging with synthetic approaches and remains to be realized.

Herein, in some embodiments, by starting with PtNi alloy nanostructures and using a partial electrochemical dealloying approach, creation is made of single atom nickel modified Pt nanowires (SANi-PtNWs) with abundant activated Pt sites next to SANi and reduced blockage of the surface Pt sites (FIG. 1), thus allowing a design of single atom tailored Pt electrocatalysts with an optimum combination of SA and ECSA to deliver high MA for diverse electrochemical reactions including hydrogen evolution reaction (HER), methanol oxidation reaction (MOR), and ethanol oxidation reaction (EOR), with high catalyst durability. Importantly, it is shown that the resulting SANi-PtNWs display a substantially increased MA of 11.8±0.43 $A/mg_{Pt}$ for HER at about −70 mV vs. RHE at pH of about 14 (comparing with reported value of 3.03 $A/mg_{Pt}$). It is further shown that such single atomic modification also greatly enhances the catalytic activity for both MOR and EOR to deliver a mass activity of 7.93±0.45 $A/mg_{Pt}$ and 5.60±0.27 $A/mg_{Pt}$ (vs. reported values of 2.92 $A/mg_{Pt}$ and 2.95 $A/mg_{Pt}$), respectively. These results demonstrate that the single atom tailoring approach offers a general strategy for creating highly efficient electrocatalysts for diverse reactions.

A nanostructure-based catalyst material of embodiments of this disclosure can benefit a wide range of applications, including catalyzing ORR and HER (e.g., for fuel cells and air batteries), oxygen evolution reaction and HER (e.g., for water splitting or hydrogen generation by an electrolyzer), methanol oxidation reaction (MOR), and ethanol oxidation reaction (EOR), among others. For example, in some embodiments, a fuel cell, an air battery, or an electrolyzer includes an anode, a cathode, and an electrolyte disposed between the anode and the cathode, and at least one of the anode or the cathode includes the catalyst material of embodiments of this disclosure.

Methods of Making

In one aspect, the present disclosure includes manufacturing method comprising: providing initial MM' nanostructures (e.g., nanowires or nanoparticles) having an initial molar ratio of M:M', wherein M is a noble metal, and M' is a metal different from M; subjecting the initial MM' nanostructures (e.g., nanowires or nanoparticles) to electrochemical dealloying to partially remove M' and form partially dealloyed MM' nanostructures (e.g., nanowires or nanoparticles) having a subsequent molar ratio of M:M', wherein the subsequent molar ratio of M:M' is greater than the initial molar ratio of M:M'; and affixing the partially dealloyed MM' nanostructures (e.g., nanowires or nanoparticles) to a catalyst support.

In some embodiments, the dealloyed MM' nanostructures (e.g., nanowires or nanoparticles) include single atomic species of M' at exterior surfaces of the MM' nanowires. In some embodiments, the partially dealloyed MM' nanostructures (e.g., nanowires or nanoparticles) have a molar content of M' in a range of about 5% to about 15%.

In some embodiments, M is Pt and M' represents at least one metal different from Pt, such as where M' is at least one metal selected from transition metals of Group 3, Group 4, Group 5, Group 6, Group 7, Group 8, Group 9, Group 10, Group 11, and Group 12 of the Periodic Table, as well as post-transition metals, and with M' being different from Pt. In some embodiments, M' is selected from nickel (Ni), iron (Fe), cobalt (Co), and copper (Cu). In some embodiments, M' is Ni. In some embodiments, M' includes two different metals $M'_1$ and $M'_2$, where $M'_1$ and $M'_2$ are different metals selected from transition metals and post-transition metals. In some embodiments, M' includes three or more different metals.

Thus, some embodiments of this disclosure are directed to a manufacturing method including: (1) providing initial PtM' nanostructures (e.g., nanowires or nanoparticles) having an initial molar ratio of Pt:M'; and (2) subjecting the initial PtM' nanostructures (e.g., nanowires or nanoparticles) to electrochemical dealloying to partially remove M' and form partially dealloyed PtM' nanostructures (e.g., nanowires or nanoparticles) having a subsequent molar ratio of Pt:M', wherein the subsequent molar ratio of Pt:M' is greater than the initial molar ratio of Pt:M'.

In some embodiments, the initial PtM' nanostructures (e.g., nanowires or nanoparticles) include an alloy of Pt and M' that can be represented by the formula $Pt_xM'_y$, where "x" represents a molar content (e.g., expressed as a percentage) of Pt, "y" represents a molar content of M', and x/y represents the initial molar ratio of Pt:M'. In some embodiments, each of x and y has a non-zero value, and subject to the condition that x+y=100 (or 100%). In some embodiments, x<y, and the initial molar ratio of Pt:M' is less than 1. In some embodiments, y has a non-zero value in a range of about 50 or greater and up to about 95 or greater, such as about 55 to about 95, about 60 to about 90, about 70 to about 90, about 75 to about 90, or about 80 to about 90.

In some embodiments, the partially dealloyed PtM' nanostructures (e.g., nanowires or nanoparticles) include an alloy of Pt and M' that can be represented by the formula $Pt_aM'_b$, where "a" represents a molar content (e.g., expressed as a percentage) of Pt, "b" represents a molar content of M', and a/b represents the subsequent molar ratio of Pt:M'. In some embodiments, each of a and b has a non-zero value, and subject to the condition that a+b=100 (or 100%). In some embodiments, a>b, and the subsequent molar ratio of Pt:M' is greater than 1. In some embodiments, b has a non-zero value in a range of about 5 or greater and up to about 15 or greater, such as at least about 6 and up to about 14, up to about 13, up to about 12, up about 11, up to about 10, up to about 9, or up to about 8.

In some embodiments, providing the initial PtM' nanostructures (e.g., nanowires or nanoparticles) in (1) includes: (1a) forming core/shell nanostructures with cores including Pt and shells including an oxide of M'; and (1b) subjecting the core/shell nanostructures to thermal annealing to form the initial PtM' nanostructures.

In some embodiments, forming the core/shell nanostructures in (1a) includes reacting a Pt-containing precursor and a M'-containing precursor in a liquid medium. Suitable Pt-containing precursors include an organometallic coordination complex of Pt with an organic anion, such as acetylacetonate, and suitable M'-containing precursors include an organometallic coordination complex of M' with an organic anion, such as acetylacetonate. The liquid medium includes one or more solvents, such as one or more organic solvents selected from polar aprotic solvents, polar protic solvents, and non-polar solvents. In some embodiments, a solvent included in the liquid medium also can serve as a reducing agent for reduction of Pt and M', although the inclusion of a separate reducing agent is also contemplated. In some embodiments, a structure-directing agent, such as polyvinylpyrrolidone (PVP), is also included in the liquid medium to promote a desired nanowire morphology, along with a source of carbonyl (CO), such as tungsten hexacarbonyl ($W(CO)_6$). Reaction can be carried out under agitation and under conditions of a temperature in a range of about 100° C. to about 250° C. or about 100° C. to about 200° C., and a time duration in a range of about 1 hour to about 12 hours or about 2 hours to about 10 hours.

In some embodiments, subjecting the core/shell nanostructures to thermal annealing in (1b) is carried out under conditions of a temperature in a range of about 300° C. to about 600° C. or about 400° C. to about 500° C. in a reducing atmosphere.

In some embodiments, subjecting the initial PtM' nanostructures to electrochemical dealloying in (2) includes subjecting the initial PtM' nanostructures to cycling, via cyclic voltammetry (CV), in the presence of an acidic solution as an electrolyte to partially remove M' from the initial PtM' nanowires. In some embodiments, CV is carried out in a voltage range of about 0.05 V to about 1.1 V vs. RHE. In some embodiments, about 50 or more CV cycles are carried out, such as about 80 or more CV cycles, about 100 or more CV cycles, about 130 or more CV cycles, about 150 or more CV cycles, or about 180 CV cycles.

Some embodiments of the manufacturing method can be further extended in which Pt is more generally replaced with M, where M represents at least one functional (e.g., catalytic) metal, such as where M is at least one noble metal, such as selected from Pt, ruthenium (Ru), palladium (Pd), silver (Ag), rhodium (Rh), osmium (Os), iridium (Ir), and gold (Au). In some embodiments, M includes two different functional metals $M_1$ and $M_2$, where $M_1$ and $M_2$ are different noble metals, such as selected from Pt, Ru, Pd, Ag, Rh, Os, Ir, and Au. In some embodiments, M includes three or more different functional metals.

As noted above, embodiments of the manufacturing method can be extended to nanostructures, which can include, e.g., nanoparticles and/or nanowires. For example, in some embodiments, the manufacturing method includes: (1) providing initial MM' (e.g., PtM') nanoparticles (or other nanostructures); and (2) subjecting the initial MM' (e.g., PtM') nanoparticles to electrochemical dealloying to form partially dealloyed MM' (e.g., PtM') nanoparticles.

In some embodiments, resulting partially dealloyed MM' (e.g., PtM') nanostructures have one or more of the following characteristics: (1) the nanostructures have lateral dimensions or extents (e.g., in terms of an average width or an average diameter) in a range of up to about 10 nm, up to about 5 nm, up to about 4 nm, up to about 3.5 nm, up to about 3 nm, up to about 2.8 nm, up to about 2.5 nm, up to about 2.3 nm, up to about 2.2 nm, or up to about 2 nm, and down to about 1.8 nm, down to about 1.5 nm, or less; (2) the nanostructures have longitudinal dimensions or extents (e.g., in terms of an average length) in a range of at least about 100 nm, at least about 150 nm, at least about 200 nm, or at least about 250 nm, and up to about 500 nm, up to about 1000 nm, or more; (3) the nanostructures have a molar content of M' in a range of about 5 or greater and up to about 15 or greater, such as at least about 6 and up to about 14, up to about 13, up to about 12, up about 11, up to about 10, up to about 9, or up to about 8; and (4) the nanostructures have exterior surfaces including single atomic species of M' at the exterior surfaces (e.g., at a surface atomic density of about 0.5 surface atom of M' per $nm^2$ or greater and up to about 10 surface atoms of M' per $nm^2$ or greater, such as at least about 1 surface atom of M' per $nm^2$ and up to about 9 surface atoms of M' per $nm^2$, up to about 8 surface atoms of M' per $nm^2$, up to about 7 surface atoms of M' per $nm^2$, up to about 6 surface atoms of M' per $nm^2$, up to about 5 surface atoms of M' per $nm^2$, up to about 4 surface atoms of M' per $nm^2$, or up to about 3 surface atoms of M' per $nm^2$).

Results

Synthesis of PtNi alloy NWs. All chemicals were purchased from Sigma-Aldrich unless otherwise specified. In a typical synthesis, about 20 mg platinum (II) acetylacetonate ($Pt(acac)_2$) and about 40 mg nickel(II) acetylacetonate ($Ni(acac)_2$) were mixed with about 130 mg glucose, about 1.7 mg $W(CO)_6$ and about 60 mg polyvinylpyrrolidone (PVP-40) in a glass vial, with about 5 ml of oleylamine and octadecene (about 3:2 volume ratio) as co-solvent. The mixture was heated to about 140° C. for about 6 hours to form Pt—NiO core-shell nanowires. The result nanowires were collected via centrifuge at about 7000 rpm for about 20 min. After loading the nanowires on carbon black, the catalysts were then annealed under about 450° C. in argon/hydrogen (about 97:3) atmosphere for about 12 hours to obtain the PtNi alloy nanowires supported on carbon black.

Material Characterizations. High spatial resolution STEM-EELS experiments were conducted by Nion Ultra-STEM-200, equipped with C3/C5 corrector and high-energy resolution monochromated EELS system. The instrument was operated at about 60 kV with a convergence semi-angle of about 30 mrad and a beam current of about 100 pA. HAADF-STEM imaging was performed using an inner and outer collection semi-angle of about 70 and about 210 mrad. EELS measurement was carried out using a dispersion of about 0.26 eV/channel and the dwell time of about 0.5 s/pixel. Background in each spectrum was removed by power-law function in commercial software package Digital Micrograph.

Electrochemical measurements for HER. To prepare the SANi-PtNW catalyst ink, about 2 mg catalysts (SANi-PtNWs on Vulcan 72 carbon black) were dispersed in about 2 mL pure ethanol. About 20 μL Nafion 117 solution was added to the ink as the binder. About 30 μL ink was drop-cast on the glassy carbon electrode (about 0.196 cm$^2$). For Pt/C, about 2 mg Pt/C (about 10% Pt/C purchased from Alfa Aesar) were dispersed in about 2 mL pure ethanol, with about 20 μL Nafion 117 solution added as the binder. About 10 μL Pt/C ink was drop-cast on the glassy carbon electrode (about 0.196 cm$^2$). The Pt loading on RDE for Pt/C, pure-PtNWs, and SANi-PtNWs was about 3.0 μg/cm$^2$, about 2.0 μg/cm$^2$, and about 2.0 pg/cm$^2$ respectively for RDE test. Alkaline/mercury oxide electrode was used as the reference electrode, and graphite rod was used as the counter electrode. The reference electrode calibration was completed in H$_2$-saturated about 1 M KOH at room temperature. About 1600 rpm rotation speed was applied on working RDE to get rid of generated bubble during the performance test. The ECSA was determined by H$_{upd}$ at about 0.05 V-about 0.35 V vs. RHE in about 0.1 M HClO$_4$. The specific and mass current densities were normalized by the ECSA and total Pt loading.

Electrochemical measurements for MOR and EOR. Alkaline/mercury oxide electrode was used as the reference electrode, and graphite rod was used as the counter electrode. The reference electrode calibration was completed in H$_2$-saturated about 1 M KOH at room temperature. About 1 M methanol and ethanol were added in to the electrolyte as the reactant for MOR and EOR, respectively. The Pt loading on RDE for Pt/C, pure-PtNWs, and SANi-PtNWs was about 3.0 pg/cm$^2$, about 3.47 pg/cm$^2$, and about 3.47 μg/cm$^2$, respectively. The ECSA was determined by H$_{upd}$ at about 0.05 V-about 0.35 V vs. RHE in about 0.1 M HClO$_4$. The specific and mass current densities were normalized by the ECSA and total Pt loading.

Electrochemical measurements for acidic CO stripping. The CV dealloying cycles were interrupted at 10$^{th}$, 50$^{th}$, 100$^{th}$, 150$^{th}$, 180$^{th}$ and 200$^{th}$ cycles. Before each CO stripping measurement, chronoamperometry is performed at about 0.05 V vs. RHE in CO saturated electrolyte (about 0.1 M HClO$_4$) for about 10 min. Then chronoamperometry is performed at about 0.05 V vs. RHE in N$_2$ saturated electrolyte (about 0.1 M HClO$_4$) for about 10 min. The CO stripping CV scan range was set in about 0.05 V to about 1.1 V vs. RHE with a positive-scan starting direction. The scan rate was set to about 50 mV/s. Ag/AgCl electrode was used as the reference electrode, and graphite rod was used as the counter electrode.

Electrochemical measurements for alkaline CO stripping. For alkaline CO striping experiment, chronoamperometry is performed at about 0.05 V vs. RHE in CO saturated electrolyte (about 1 M KOH) for about 15 min. After the current reached a steady state, chronoamperometry is performed at about 0.05 V vs. RHE in N$_2$ saturated electrolyte (about 1 M KOH) for about 10 min. The CO stripping CV scan range was set between about 0.05 V to about 1.1 V vs. RHE with a positive-scan starting direction. The scan rate was set to about 25 mV/s. alkaline/mercury oxide electrode. The graphite rod was used as the counter electrode.

Figure 6A:
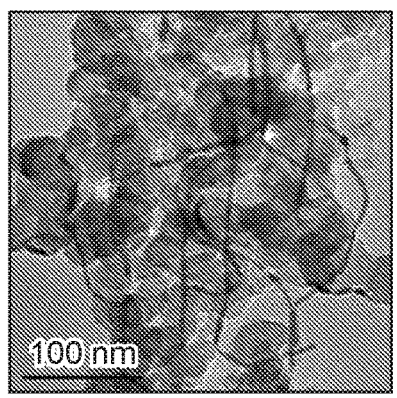
FIG. 6($a$) shows TEM images of PtNi alloy nanowire and FIG. 6($b$) shows TEM images of SANi-PtNWs.
Figure 6B:
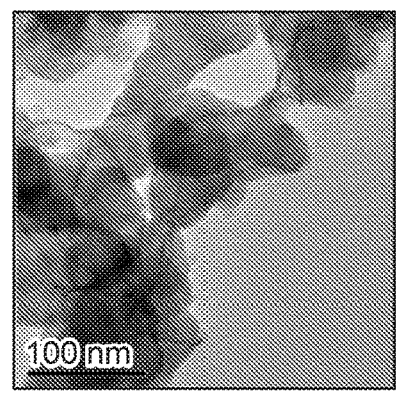
Figure 6C:
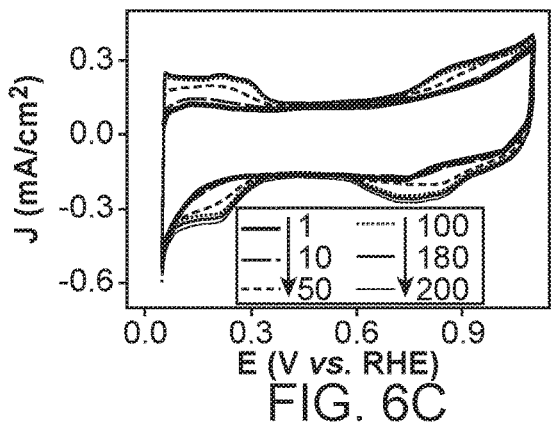
Figure 6D:
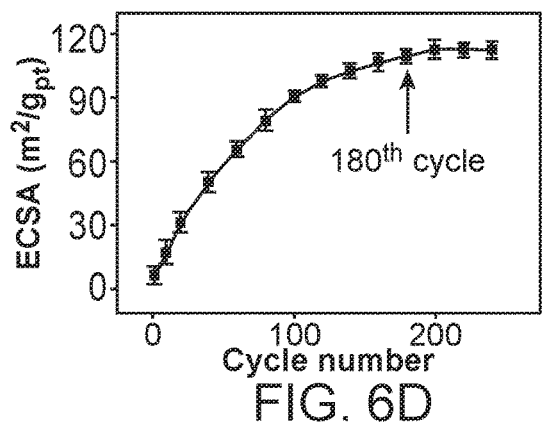
Figure 6E:
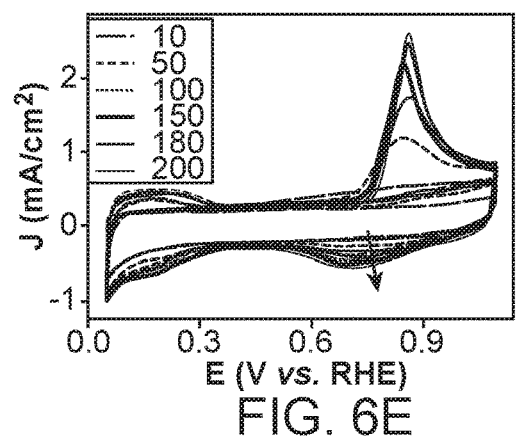
Figure 6F:
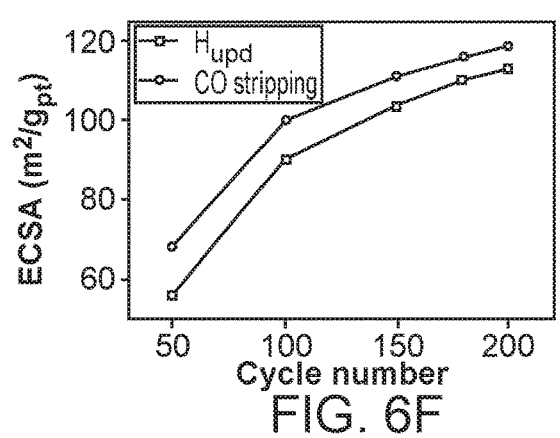

Catalyst synthesis and characterizations. A streamlined one-pot synthetic procedure followed by an annealing process in argon/hydrogen mixture (Ar/H$_2$: about 97/3) was used to produce the Ni rich PtNi alloy NWs (composition of about Pt$_{17}$Ni$_{83}$) with an average length of about 300 nm and diameter of about 4.5 nm (FIG. 6a). The resulting PtNi NWs were dispersed on carbon support in ethanol to form the catalyst ink, which was then cast onto glassy carbon rotating disk electrode (RDE, geometry area=about 0.196 cm$^2$) to form a homogeneous film. An electrochemical dealloying process was performed via cyclic voltammetry (CV) between about 0.05 V-about 1.10 V vs. reversible hydrogen electrode (RHE) in about 0.1 M HClO$_4$ to gradually remove nickel species. The ECSA gradually increases with increasing number of CV cycles and eventually saturates at about 112.9±5.4 m$^2$/g$_{Pt}$ after 200 CV cycles (FIG. 6c, d), which indicates the completion of dealloying process to obtain pure Pt NWs (pure-PtNWs). Such an ECSA evolution trend was also confirmed by acidic CO stripping experiments (FIG. 6e, f). The average diameter is reduced from about 4.5 nm before to about 2.0 nm after the complete dealloying process (FIG. 6b).

Figure 6G:
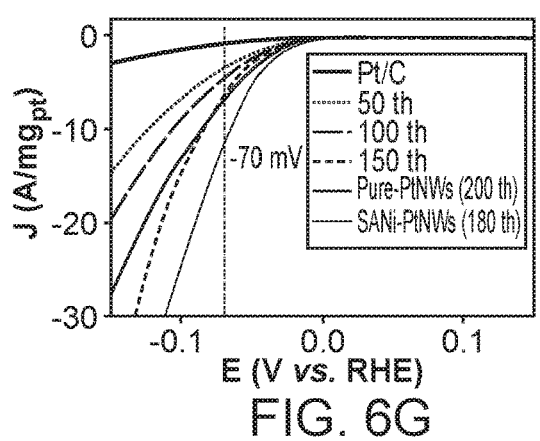
Figure 6H:
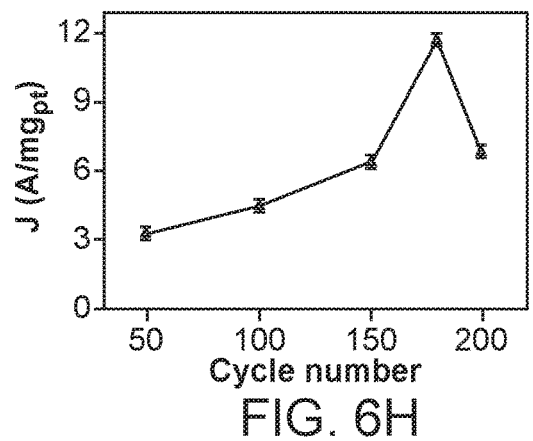

To tailor the nickel decoration in the resulting PtNWs, the acidic CV dealloying process is interrupted periodically to produce PtNWs with different amount of nickel decorating species, which was then transferred into nitrogen-saturated about 1 M KOH for 100 additional CV cycles between about 0.05 V-about 1.6 V for further activation. The resulting dealloyed NWs with selectively decorated Ni species are generally stable in the basic conditions, in which their catalytic performance is evaluated. HER is initially used as a model reaction to evaluate the activity of the resulting PtNW catalysts with varying amount of nickel species (FIG. 6g) and it is determined that a peak performance is achieved at 180 acidic dealloying CV cycles. Too much (<180 cycles) or too little (>180 cycles) nickel species would reduce the overall HER activity (FIG. 6h). The produced Ni species are stable in basic conditions. The following discussion focuses on this material produced with 180 dealloying CV cycles unless otherwise specifically mentioned.

Figure 2:
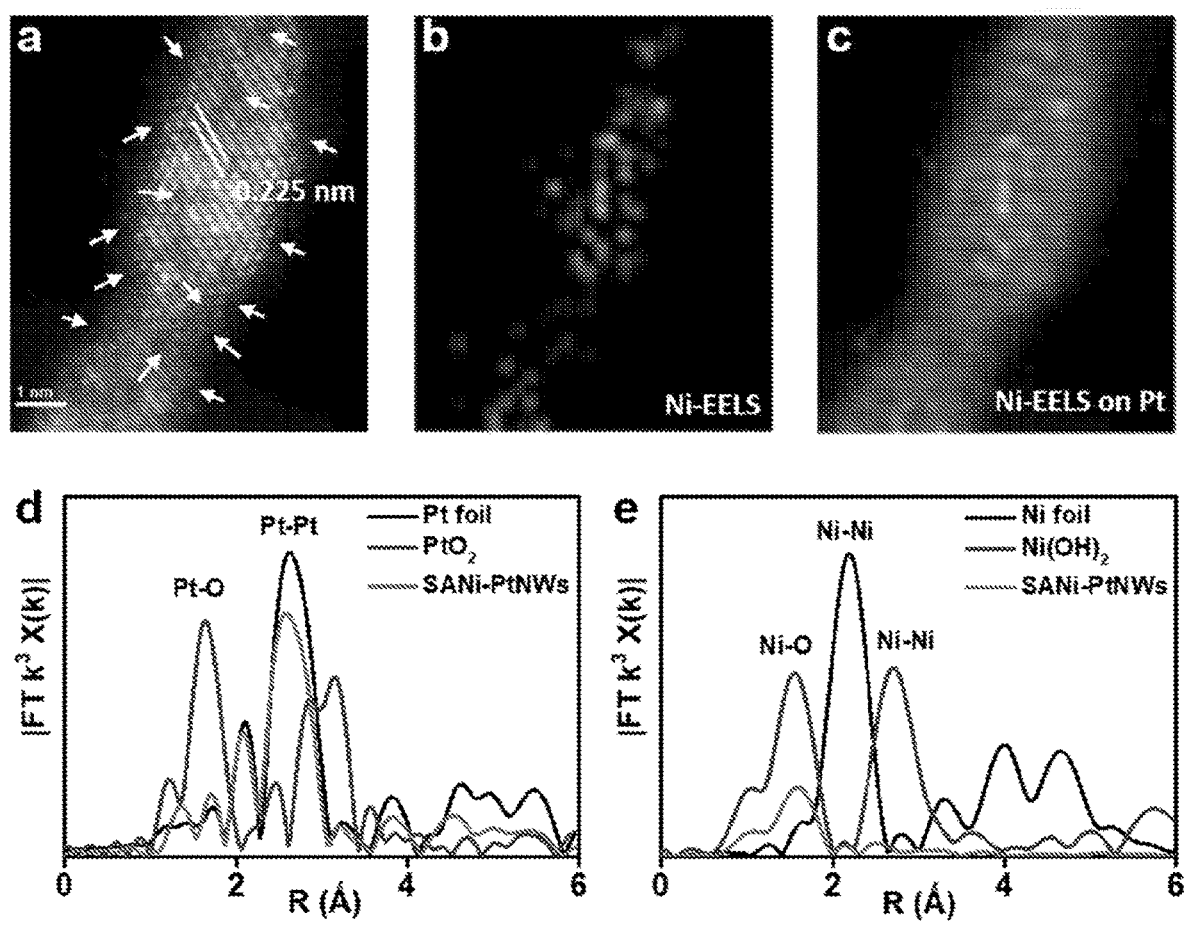
FIG. 2 shows structural characterization of an embodiment of SANi-PtNWs.

High-angle annular dark-field scanning transmission electron microscopy (HAADF-STEM) was conducted to probe the atomic structure of the resulting material. The HAADF-STEM shows an ultrafine 1D crystalline configuration with rich surface defects, concave cavity sites and steps as highlighted by white arrows (FIG. 2a). HAADF-STEM image shows that the (111) spacing is about 0.225 nm (FIG. 2a), about 2.2% smaller than that of crystalline Pt (about 0.230 nm). The composition analysis by inductively coupled plasma atomic emission spectrometry (ICP-AES) reveal an overall Pt:Ni ratio of about 92:8 for SANi-PtNWs, corresponding to about 2.4 Ni atoms per square nanometer surface area. Considering the Pt surface atom density of about 15 Pt/nm$^2$, the surface Ni:Pt atom ratio is about 1:6. Electron energy loss spectroscopy (EELS) elemental mapping of Ni (FIG. 2b) and that overlaid on Pt HAADF contrast image (FIG. 2c) reveals that the nickel atoms are sparsely distributed on the PtNWs.

The Pt extended X-ray absorption fine structure (EXAFS) fitting result shows a main peak at about 2.74 Å (FIG. 2d), which is about 1.8% smaller than the Pt—Pt bond length in bulk Pt (about 2.79 Å in Pt foil), consistent with the TEM studies described above. The Ni EXAFS shows a single peak at about 1.6 Å (FIG. 2e), which can be attributed to the first shell Ni—O bond. There is no noticeable peak at about 2.1 Å (for Ni—Ni coordination in metallic Ni) or about 2.7 Å (For Ni—O—Ni coordination in Ni(OH)$_2$) (FIG. 2e), strongly confirming that the Ni species exist as single atomic species without long range coordination to another Ni center.

HER measurements of the SANi-PtNWs. The HER activity of the SANi-PtNWs was investigated by using the rotation disk electrode (RDE) test and compared against the fully dealloyed pure-PtNWs and a commercial Pt/C (about 10 wt. %). The CV studies of the SANi-PtNWs show two exclusive Ni$^{2+}$/Ni$^{3+}$ redox peaks at about 1.321 V (Ni$^{3+}$→Ni$^{2+}$) and about 1.388 V (Ni$^{2+}$→Ni$^{3+}$) vs. RHE respectively (FIG. 3a), which are absent in the pure-PtNWs. These redox peaks are the signature of nickel species, which further confirm that the nickel species was successfully decorated on PtNWs. The integration of the hydrogen absorption desorption region gives a high ECSA of 106.2±4.5 m$^2$/g$_{Pt}$ for SANi-PtNWs, nearly comparable to that of the pure-PtNWs, and considerably larger than those of reported Pt—Ni(OH)$_2$ based nano-composites (ECSA of about 20-60 m$^2$/g$_{Pt}$), highlighting it is desired to precisely tune the number and structure of the decorating species to mitigate against undesired blockage of surface reactive sites and ensure high ECSA.

Figure 3C:
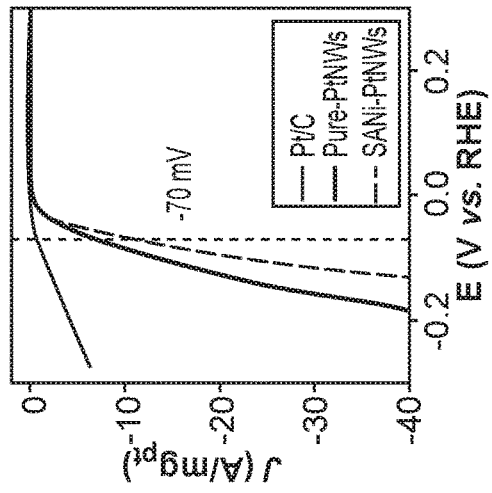
FIG. 3(b) shows electrochemically active surface area normalized and FIG. 3(c) shows Pt mass loading normalized HER LSVs with about 95% iR-compensation at the scan rate of about 5 mV/s.
Figure 3F:
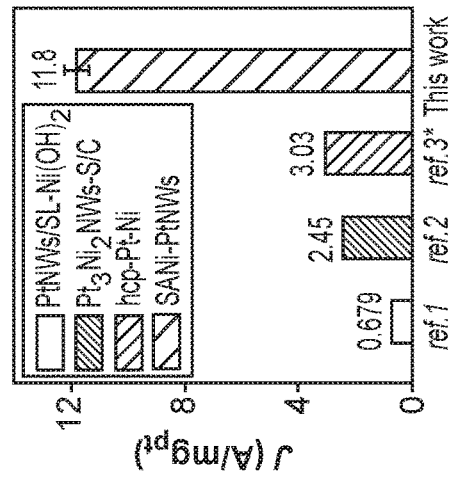
FIG. 3(f) shows a comparison of HER mass activity of the SANi-PtNWs at about −70 mV vs. RHE with values reported (Ref. 1 is Yin, H et al., Nature communications 6, 6430 (2015); Ref. 2 is Wang, P., et al., Nature communications 8, 14580 (2017); Ref. 3 is Cao, Z., et al., Nature communications 8, 15131 (2017). The material in Ref. 3 was tested in 0.1 M KOH. Error bars in e and f indicate the standard deviation of ten independent samples.
Figure 3B:
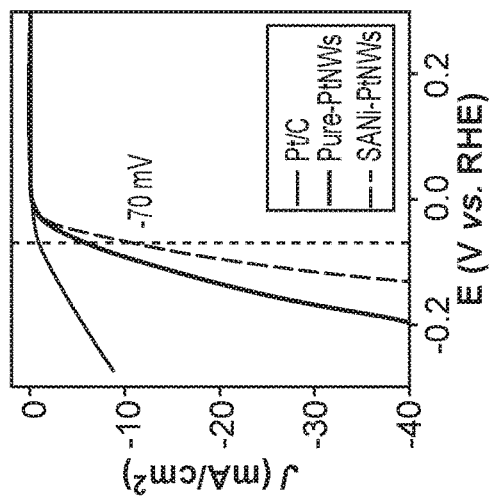

The HER performance of SANi-PtNWs was further evaluated using linear sweep voltammetry (LSV) at room temperature in about 1 M N$_2$-saturated KOH with a scan rate of about 5 mV/s and compared against commercial Pt/C and pure-PtNWs (FIG. 3b). The specific activities are about 0.95, 6.11±0.34, and 10.72±0.41 mA/cm$^2$ at about −70 mV vs. RHE for the Pt/C, pure-PtNWs, and SANi-PtNWs, respectively. It should be noted that the specific activities reported here are normalized to the ECSA, in contrast to the electrode geometrical area used in other studies. Meanwhile, the LSV curves normalized by Pt mass give a mass activity of about 0.71, 6.90±0.36, and 11.80±0.43 A/mg$_{Pt}$ for Pt/C, pure-PtNWs, and SANi-PtNWs at about −70 mV vs. RHE (FIG. 3c). The Tafel diagrams give a Tafel-slope of about 60.3 mV/dec for the SANi-PtNWs compared to about 78.1 mV/dec for the PtNWs and about 133.4 mV/dec for the Pt/C (FIG. 3d), clearly demonstrating the considerably improved HER kinetics with the single Ni atom decorated catalysts.

Figure 3E:
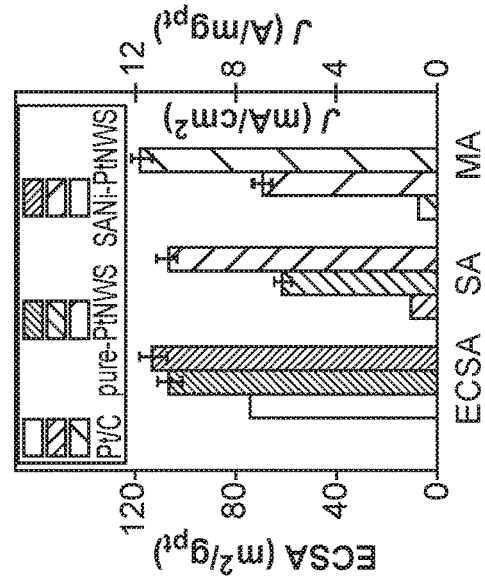
FIG. 3(e) shows a comparison of ECSA (black arrow to the left), specific activities (normalized by ECSA, green arrow to the right) and mass activities (normalized by Pt mass, purple arrow to the right) for HER at about −70 mV vs. RHE for all tested materials.
Figure 3A:
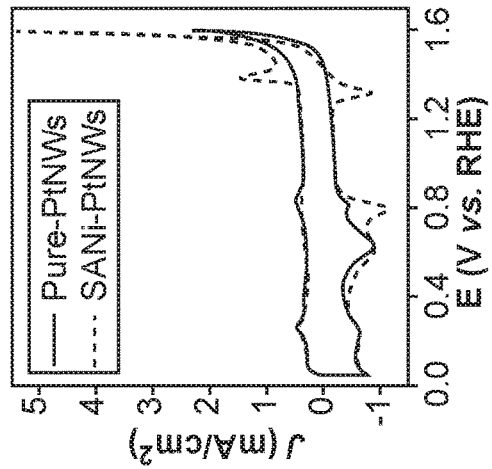
FIG. 3(a) shows cyclic voltammetry (CV) performed between about 0.05 V-about 1.60 V vs. RHE at a scan rate of about 50 mV/s.
Figure 3D:
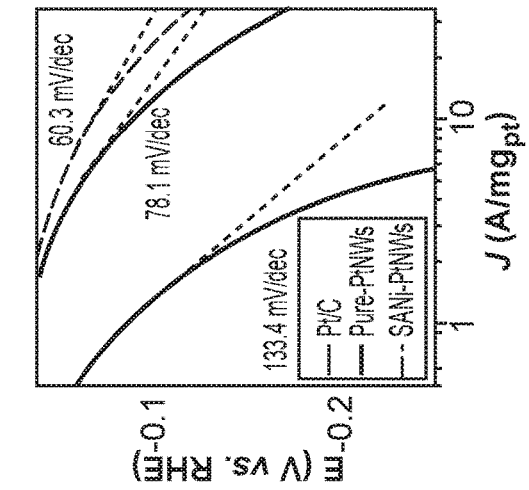
FIG. 3(d) shows Pt mass normalized HER Tafel-slope.
Figure 7:
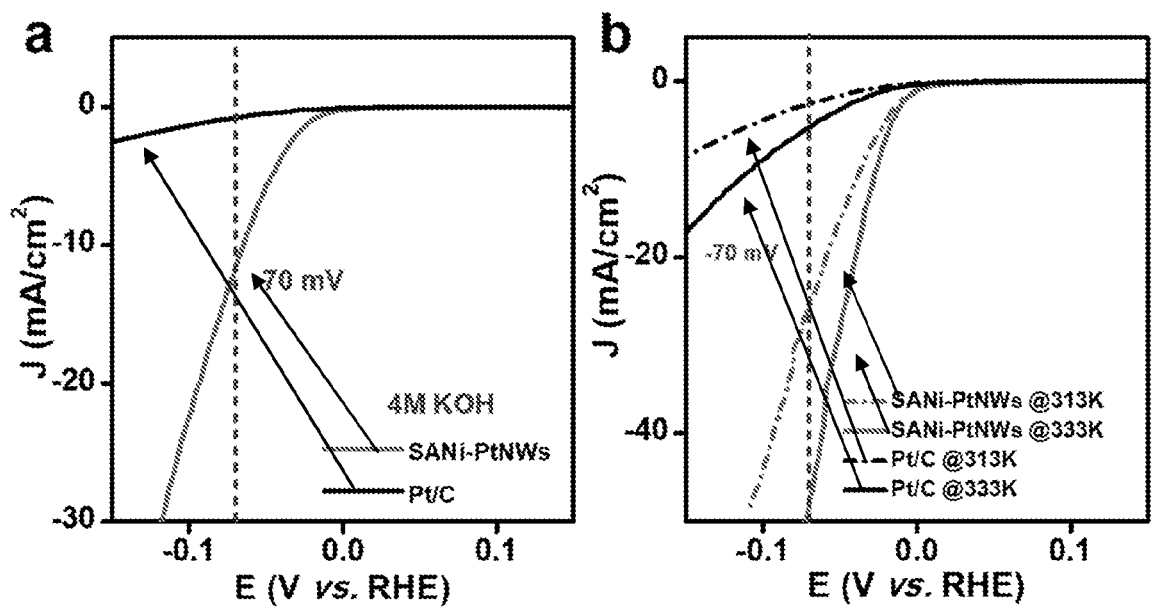
FIG. 7 shows HER performance of the SANi-PtNWs and Pt/C under harsher conditions.

Further comparison is made of the ECSA, SA and MA of the three different catalysts tested (FIG. 3e). Both the pure-PtNWs and the SANi-PtNWs exhibit a similar ECSA, much higher than that of the Pt/C control. Importantly, the specific activity of the SANi-PtNWs is nearly twice that of the pure-PtNWs, clearly demonstrating that the SANi decoration considerably improves the HER kinetics. Together, with simultaneous achievement of high ECSA and high SA, the SANi-PtNWs deliver a clear leap in mass activity, achieving an MA about 3-10 times higher than those of the state-of-the-art HER catalysts reported (FIG. 3F, Table 1). Additionally, at about −70 mV vs. RHE, SANi-PtNWs showed a specific activity (normalized by ECSA) of about 11.8 mA/cm$^2$ in about 4 M KOH (FIG. 7a) and about 25.7 mA/cm$^2$ and about 48 mA/cm$^2$ at elevated temperature (about 313 K and about 333 K, FIG. 7b), about 9-14 times higher than those of Pt/C. These results indicate the promoted HER activity of SANi-PtNWs is maintained under harsher conditions.

Figure 8:
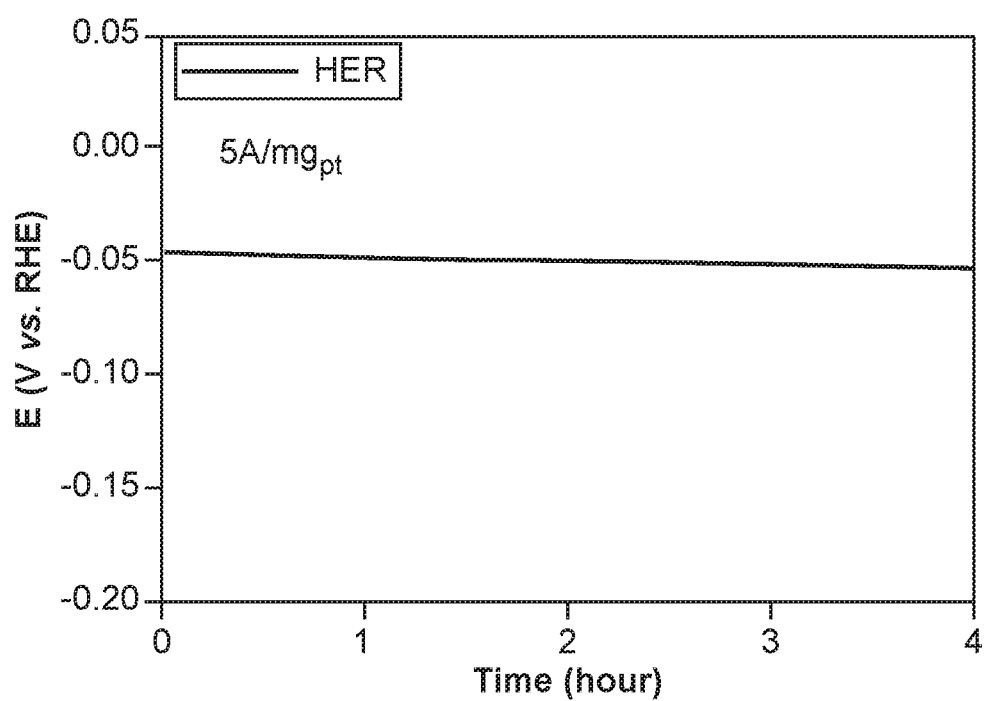
FIG. 8 shows HER chronopotentiometry test of SANi-PtNWs, in about 1 M KOH at a constant current density of about 5 A/mg$_{Pt}$.

It is noted that the preparation of SANi-PtNWs by interrupted dealloying process is highly repeatable and the resulting materials show consistent performance in 10 independent batches (FIG. 2d). Furthermore, chronopotentiometry stability test shows negligible over-potential change for HER when operating at a constant current density of about 5 A/mg$_{Pt}$ in about 1 M KOH after about 4 hours, indicating such single atomic decoration is stable in the electrochemical processes (FIG. 8). The improved HER durability could be partly attributed to multipoint line contacts between the 1D NWs and the carbon support, which prevents physical movement and aggregation (note that the movement and aggregation of 0D nanoparticle catalysts contribute significantly to the degrading activities). Additionally, the SANi-PtNWs can effectively reduce the reaction kinetic barrier, delivering a higher current density at the reduced over-potential, which could also contribute to the durability of the catalyst during long time operation.

TABLE 1

Comparing HER performance of SANi-PtNWs and pure-PtNWs vs. other catalysts at about −70 mV vs. RHE.

| Material | Test condition | ECSA (m$^2$/g$_{Pt}$) | SA (mA/cm$^2$) | MA (A/mg$_{Pt}$) |
|---|---|---|---|---|
| SANi-PtNWs | 1M KOH | 106.2 ± 4.5 | 10.72 ± 0.41 | 11.8 ± 0.43 |
| pure-PtNWs | | 112.9 ± 5.4 | 6.11 ± 0.34 | 6.90 ± 0.36 |
| #PtNWs/SL Ni(OH)$_2$ | 1M KOH | 27.4 | 2.48 | 0.68 |
| Pt$_3$Ni$_2$ NWs-S/C† | 1M KOH | NA | NA | 2.45 |
| hcp-Pt-Ni§ | 0.1M KOH | 26.6 | 11.41 | 3.03 |

Pt nanowires grown on single-layered Ni(OH)$_2$ nanosheets;
†PtNi/NiS nanowires;
§hcp platinum-nickel alloy excavated nano-multipods.

Figure 4A:
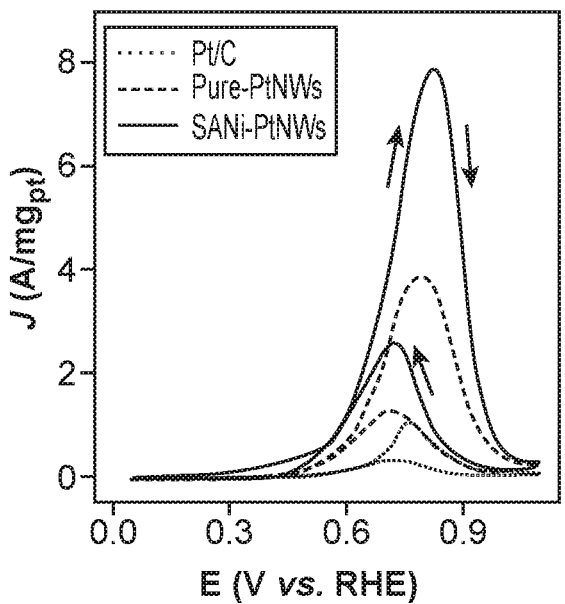
FIG. 4 shows MOR and EOR electrocatalytic activities of an embodiment of SANi-PtNWs, an embodiment of pure-PtNWs, and an embodiment of Pt/C in about 1 M KOH electrolyte.
Figure 4B:
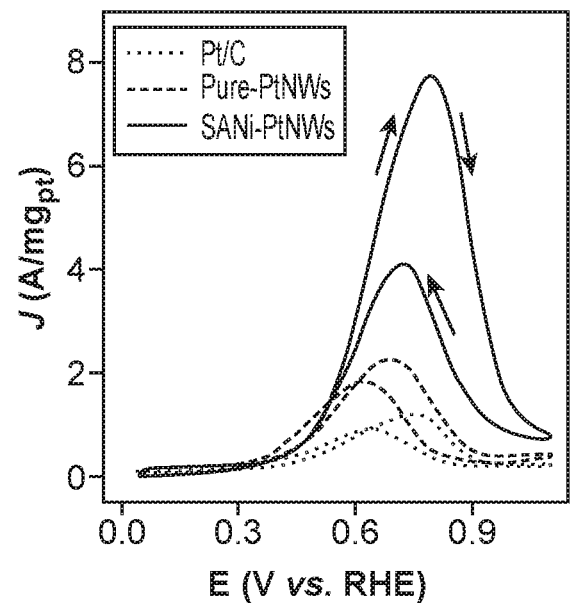
Figure 4C:
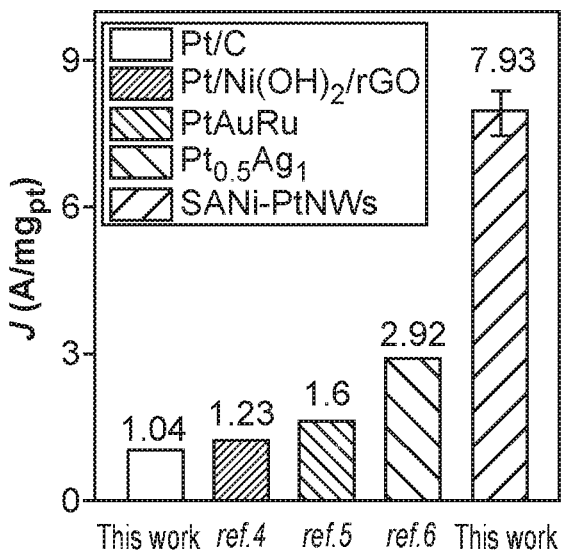

MOR/EOR activities of the SANi-PtNWs. To further explore the SANi-PtNWs as multifunctional electrocatalysts, evaluation is made of their performance for methanol oxidation reactions (MOR) and ethanol oxidation reactions (EOR). The SANi-PtNWs were prepared in the same way as those described in the HER experiments. The MOR test was conducted in aqueous electrolyte with about 1 M methanol and about 1 M KOH. Cyclic voltammetry (CV) with a scan rate of about 20 mV/s was used to evaluate catalytic properties of the SANi-PtNWs and compared with that of the pure-PtNWs and the Pt/C under the same test conditions. Importantly, the Pt mass normalized CV curve shows a peak current density of 7.93±0.45 A/mg$_{Pt}$ at about 0.816 V vs. RHE (FIG. 4a), more than about 7 and about 2 times those of the commercial Pt/C (about 1.04 A/mg$_{Pt}$) and the pure-PtNWs (about 3.87 A/mg$_{Pt}$), respectively. Additionally, an about 144 mV decrease of the onset over-potential (specified as over-potential to reach a mass activity of about 0.1 A/mg$_{Pt}$) is observed in the SANi-PtNWs when compared with that of Pt/C, indicating the lower activation barrier of methanol oxidation on the SNAi-PtNWs surface (FIG. 4a). Similarly, the EOR test in about 1 M ethanol/1 M KOH solution shows a peak mass activity of 5.60±0.27 A/mg$_{Pt}$ at about 0.785 V vs. RHE for the SANi-PtNWs (FIG. 4b), which is more than about 7 and about 3 times higher than those of the Pt/C and the pure-PtNWs, respectively. Additionally, an about 61 mV decrease of the onset over-potential is also observed for the SANi-PtNWs vs. Pt/C reference.

Figure 9:
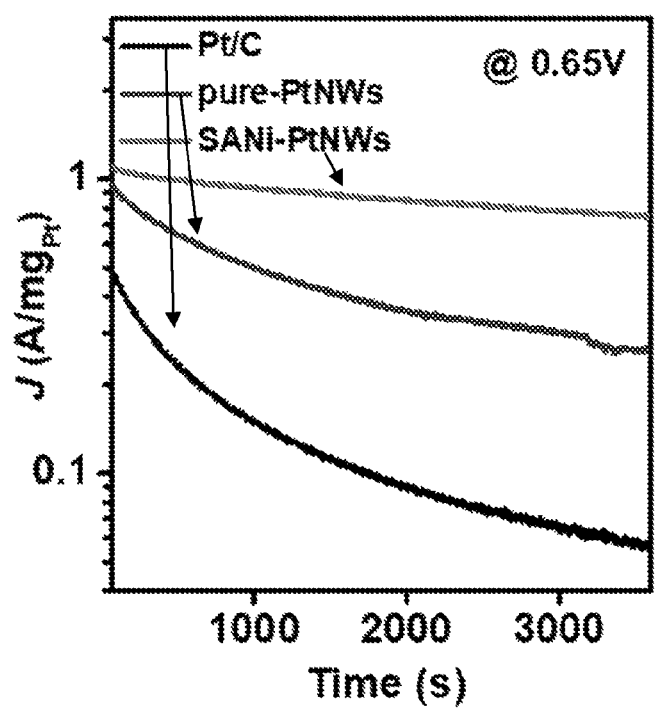
FIG. 9 shows a chronoamperometry MOR test at the potential of about 0.65 V vs. RHE.
Figure 10A:
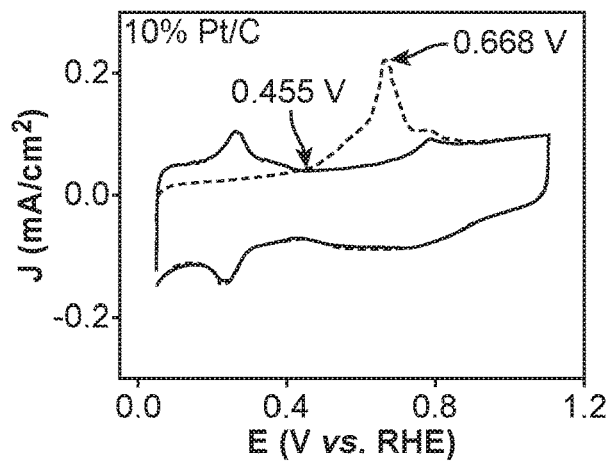
FIG. 10($a$) shows CO stripping results for about 10% Pt/C.
Figure 10B:
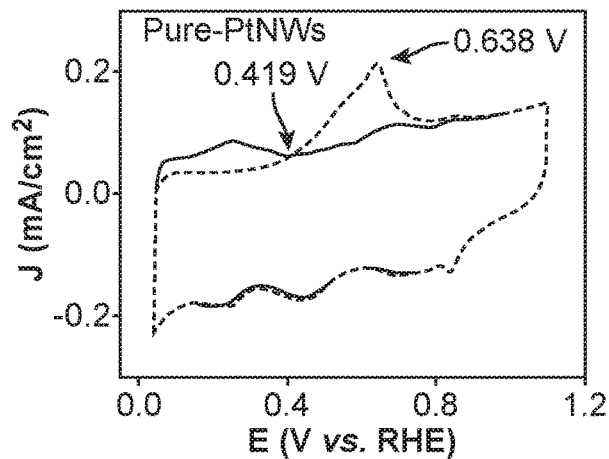
Figure 10C:
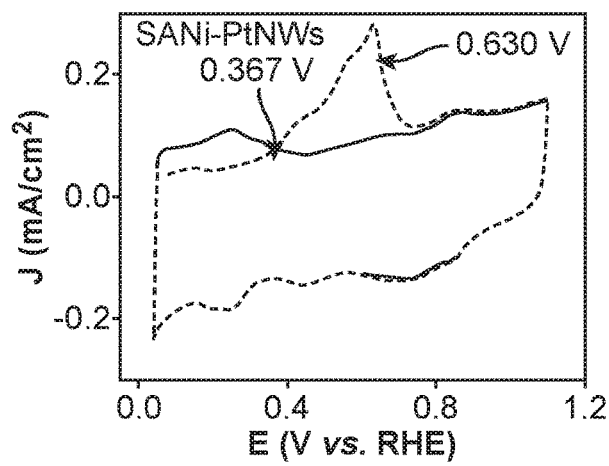

The chronoamperometry (CA) tests were used to evaluate the stability of SANi-PtNWs, pure-PtNWs and Pt/C in MOR (FIG. 9). Apparently, the MOR activity of the Pt/C benchmark material shows a rather rapid decay to about 0.056 A/mg$_{Pt}$ after about 3600 s CA test at about 0.650 V vs. RHE. In contrast, the SANi-PtNWs shows a relatively stable mass activity of about 0.76 A/mg$_{Pt}$ after about 3600 s CP test under the same conditions, clearly demonstrating the superior stability of SANi-PtNWs catalysts when compared to the Pt/C. The pure-PtNWs also show a faster activity decay to about 0.26 A/mg$_{Pt}$ after about 3600 s CA test (vs. about 0.76 A/mg$_{Pt}$ for the SANi-PtNWs). The studies demonstrate that the SANi decoration boosts the activity, and also improves the durability, which could be ascribed to the weaker CO binding strength on SANi-PtNWs surface compared with it on the Pt/C and pure-PtNWs surface (FIG. 10).

Figure 4D:
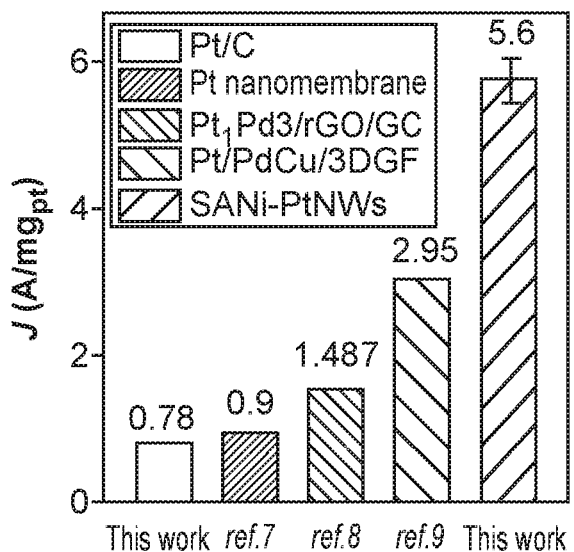

Comparing with the state-of-art Pt or PtRu-based MOR catalysts tested under the same conductions, the SANi-PtNWs catalysts show the highest specific activity and mass activity, with the mass activity achieved in the SANi-PtNWs catalysts of about 3-6 times of the state-of-art values reported (FIG. 4d). Comparing with other EOR catalysts reported, the SANi-PtNWs also show considerable advantage in mass activity (FIG. 4e), about 2-6 times of the best values reported. Together, these studies clearly demonstrate that SANi tailored pure-PtNWs presents a major leap for both MOR and EOR, providing significant potential for alkaline anion exchange membrane fuel cells development.

Together, an effective approach is presented to tailor Pt nanocatalysts with single atomic nickel (SANi) species. By combining EXAFS analyses with atomic scale STEM and EELS mapping studies, it is verified that the PtNW surface was successfully modified with surface SANi. Electrocatalytic test revealed that the resulting SANi modified Pt nanocatalysts exhibit considerably improved HER performance when compared with other HER catalysts. The studies indicate that an optimum decoration density (surface Ni:Pt ratio of about 1:6) is desired for maximizing specific activity while retaining a high ECSA. This decoration density can be readily tuned, in a fully repeatable way, by the gradual dealloying process. Additional MOR and EOR electro-catalytic studies further demonstrate greatly improved mass activities for these reactions. It is important to note that the mass activities achieved in SANi-PtNWs represent a conceptual advance over the state-of-art, with the Pt mass activities for HER, MOR and EOR about 4-20, about 3-6, and about 2-6 times higher than the state-of-art values reported.

A fully dealloyed pure-Pt NWs can show high activity for ORR, which can be largely attributed to their defective surface featuring rich atomic vacancies and strain. Taking a step further, the current evaluation further explores single atom decoration as a general strategy for tailoring the local electronic structure of Pt catalysts to achieve further enhanced specific activity for a series of technological relevant electrochemical reactions at little or no sacrifice of the surface area, and thus delivering optimized mass activity that is desired for practical applications. The significant enhancement of mass activity for various electrocatalytic systems clearly demonstrates that the surface decoration with single atoms provides an effective and general strategy for tailoring precious metal catalysts for diverse reactions. This strategy of single-atom decoration, by interrupted dealloying, can be applicable to other dopant elements such as Fe, Co or Cu species.

It is also noted that the single-atom tailoring of Pt nanocatalysts is also conceptually different from other single-atom catalysts. In a single-atom catalyst, single metallic atoms are often dispersed on a host substrate with the single metal atoms functioning as the primary active sites. To the opposite, in the case here, single metal atoms decorate the surface of precious metal Pt catalysts to modify the local atomic configuration and electronic structures of surrounding Pt atoms, thus tailoring their catalytic activity for specific reactions. Here single metal atoms are not the primary active sites but play a role as a promoter to enhance the kinetics (e.g., about 60 mV/dec) and activity (e.g., about 11.8 A/mg$_{Pt}$) of the Pt-based catalysts without significantly blocking the surface active sites (e.g., about 106 m$^2$/g$_{Pt}$), thus providing a general strategy for creating multifunctional electrocatalysts with optimized surface area, specific activity, and mass activity at the same time.

The U.S. Department of Energy has a specification for the cost of produced hydrogen with commercial water alkaline electrolyzer. Based on the Multi-year Research, Development, and Demonstration (MYRD&D) plan 2025 of the Fuel Cell Technologies Office (FCTO), the water electrolysis stack energy efficiency should reach 43 kilowatt hours (kWh)/kg-H$_2$ and achieve a degradation rate of less than 4 millivolt (mV)/1,000 hours. So the hydrogen production cost should be reduced to the level of around $2/gge (gge: a kilogram of hydrogen is approximately equal to a gallon of gasoline equivalent (gge) on an energy content basis) in order to make hydrogen fuel cell vehicles competitive on a $/mile basis with competing vehicles [gasoline in hybrid-electric vehicles (HEVs)] in 2020.

Hydrogen production reaction is generally performed under high current density; thus, to use lower over-potential to achieve higher current density for a long time operation is of significance to reduce the large cost from electricity grid and replacement of devices. In principle, the Tafel slope of catalysts determines the potential to increase the hydrogen production rate by about 10 times. Non-precious metal-based catalysts, despite the lower price of such metal, still suffer from large Tafel slope and lower intrinsic activity, as well as the high impedance resulting from the high loading of catalysts film and low electron transfer efficiency at metal oxides surface, leading to high cost of electricity and low stability. Commercial Pt catalysts, however, also suffer from low kinetics (about 120 mV/dec) and mass activity (about 0.71 A/mg$_{Pt}$) in alkaline condition, and transition metal decorated Pt catalysts, although with improved Tafel slope, have low ECSA (e.g., about 20-60 m$^2$/g$_{Pt}$) resulting from surface decoration leading to the waste of available surface active sites. This represents an intrinsic dilemma for the surface modification strategy, which may tailor the local electronic structure to boost the SA for a given reaction, but usually at a substantial sacrifice of the ECSA. Together, these competing factors make it extremely challenging to simultaneously achieve a high SA and a high ECSA in the same catalyst system, which is desired for delivering a high MA. In this regard, the ultimate limit of the decorating species is single atoms, which uses the smallest number of nickel species to activate the most Pt atoms while blocking the least amount of surface Pt sites to ensure the highest mass activity. In the case here, single metal atoms decorate the surface of precious metal Pt catalysts to modify the local atomic configuration and electronic structures of surrounding Pt atoms, thus tailoring their catalytic activity for specific reactions. Moreover, the durability of Pt nanoparticles can suffer from the agglomeration of Pt particles after long time reaction. For the approach here, benefited from the multi contact points between nanowires and a carbon support, the PtNWs catalysts have high electron transfer efficiency, high catalytic stability and low agglomeration.

Thus, this strategy of single atom decoration of PtNWs provide a strategy to tailor Pt based catalysts to achieve the DOE hydrogen production target and can be applicable to other dopant elements, such as Fe, Co or Cu species, targeted at other power production and storage applications such as direct methanol fuel cells and proton-exchange membrane fuel cells.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "nanostructure" refers to an object that has at least one dimension in the nm range. A nanostructure can have any of a wide variety of shapes, and can be formed of a wide variety of materials. Examples of nanostructures include nanowires and nanoparticles.

As used herein, the term "nanowire" refers to an elongated nanostructure. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the m range, and an aspect ratio that is about 5 or greater.

As used herein, the term "nanoparticle" refers to a spherical or spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A catalyst material comprising:
a catalyst support; and
PtM' nanostructures affixed to the catalyst support, where M' is a metal other than Pt,
wherein the PtM' nanostructures include single atomic species of M' at exterior surfaces of the PtM' nanostructures.

2. The catalyst material of claim 1, having an electrochemical active surface area of at least about 80 $m^2/g_{Pt}$, at least about 85 $m^2/g_{Pt}$, at least about 90 $m^2/g_{Pt}$, at least about 95 $m^2/g_{Pt}$, or at least about 100 $m^2/g_{Pt}$.

3. The catalyst material of claim 1, wherein a surface atomic density of M' at the exterior surfaces of the PtM' nanowires is in a range of about 0.5 surface atom of M' per $nm^2$ to about 10 surface atoms of M' per $nm^2$.

4. The catalyst material of claim 1, wherein the PtM' nanowires have a molar content of M' in a range of about 5% to about 15%.

5. The catalyst material of claim 1, wherein M' is a transition metal.

6. The catalyst material of claim 5, wherein M' is selected from Ni, Fe, Co, and Cu.

7. The catalyst material of claim 5, wherein M' is Ni.

8. A fuel cell comprising the catalyst material of claim 1.

9. An air battery comprising the catalyst material of claim 1.

10. An electrolyzer comprising the catalyst material of claim 1.

11. A manufacturing method comprising:
providing initial MM' nanowires having an initial molar ratio of M:M', wherein M is a noble metal, and M' is a metal different from M;
subjecting the initial MM' nanowires to electrochemical dealloying to partially remove M' and form partially dealloyed MM' nanowires having a subsequent molar ratio of M:M', wherein the subsequent molar ratio of M:M' is greater than the initial molar ratio of M:M'; and affixing the partially dealloyed MM' nanowires to a catalyst support, wherein the partially dealloyed MM' nanowires include single atomic species of M' at exterior surfaces of the MM' nanowires.

12. The method of any of claim 11, wherein the partially dealloyed MM' nanowires have a molar content of M' in a range of about 5% to about 15%.

13. The method of any of claim 11, wherein M is Pt.

14. The method of any of claim 11, wherein M' is a transition metal different from Pt.

15. The method of claim 14, wherein M' is selected from Ni, Fe, Co, and Cu.

16. The method of claim 14, wherein M' is Ni.

17. The catalyst material of claim 2, wherein a surface atomic density of M' at the exterior surfaces of the PtM' nanowires is in a range of about 0.5 surface atom of M' per $nm^2$ to about 10 surface atoms of M' per $nm^2$.

18. The catalyst material of claim 2, wherein the PtM' nanowires have a molar content of M' in a range of about 5% to about 15%.

19. The catalyst material of claim 2, wherein M' is a transition metal.

20. The catalyst material of claim 1, wherein M includes two different functional metals M1 and M2, wherein M1 and M2 are different noble metals selected from Pt, Ru, Pd, Ag, Rh, Os, Ir, and Au.

* * * * *